United States Patent
Ovadia et al.

(10) Patent No.: US 9,792,402 B1
(45) Date of Patent: Oct. 17, 2017

(54) METHOD AND SYSTEM FOR DEBUGGING A SYSTEM ON CHIP UNDER TEST

(71) Applicant: Cadence Design Systems, Inc., San Jose, CA (US)

(72) Inventors: Meir Ovadia, Rosh Ha-ayin (IL); Kalev Alpernas, Modi'in (IL)

(73) Assignee: Cadence Design Systems, Inc., San Jose, CA (US)

( * ) Notice: Subject to any disclaimer, the term of this patent is extended or adjusted under 35 U.S.C. 154(b) by 206 days.

(21) Appl. No.: 14/755,071

(22) Filed: Jun. 30, 2015

(51) Int. Cl.
*G06F 17/50* (2006.01)
*G06F 11/32* (2006.01)

(52) U.S. Cl.
CPC ........ *G06F 17/5081* (2013.01); *G06F 11/322* (2013.01); *G06F 11/323* (2013.01); *G06F 17/5022* (2013.01); *G06F 17/5031* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 5,991,533 A * | 11/1999 | Sano | ............... | G06F 17/5022 703/22 |
| 6,163,763 A * | 12/2000 | Cox | ............... | G06F 11/0769 703/14 |
| 6,263,301 B1 * | 7/2001 | Cox | ............... | G06F 17/5022 702/67 |
| 6,751,565 B2 * | 6/2004 | Naroska | ............. | G01R 31/3183 345/441 |
| 6,829,751 B1 * | 12/2004 | Shen | ............. | G01B 31/318519 716/106 |
| 7,185,295 B2 * | 2/2007 | Park | ............... | G01R 31/318357 714/E11.168 |
| 7,437,692 B2 * | 10/2008 | Oberlaender | ....... | G06F 17/5022 703/14 |
| 7,571,400 B2 * | 8/2009 | Park | ............... | G01R 31/318357 703/14 |
| 8,073,820 B2 * | 12/2011 | Srinivasan | ........ | G06F 17/30386 703/14 |
| 8,781,808 B2 * | 7/2014 | Yang | ................... | G06F 17/5022 703/13 |

(Continued)

OTHER PUBLICATIONS

U.S. Appl. No. 14/462,852, filed Aug. 19, 2014, Teplitsky et al.
Office Action for U.S. Appl. No. 14/462,852 dated Aug. 2, 2016.

*Primary Examiner* — Leigh Garbowski
(74) *Attorney, Agent, or Firm* — Pearl Cohen Zedek Latzer Baratz LLP (57) ABSTRACT

A method for debugging a system on chip (SoC) under test, the method may include executing a test code on the SoC, the test code designed to invoke a plurality of actions; recording output data from the SoC resulting from the executed test code; linking between actions detected in the recorded output data and actions of the plurality of actions of the test code by identifying a start and an end times of each of the detected actions in the recorded output data, and associating the identified start and end times with a start and an end times of actions of the plurality of actions of the test code; and causing display, via a graphical user interface, of a waveform representation of the detected actions over time, a representation of the test code and a representation of the output log.

13 Claims, 7 Drawing Sheets

(56) References Cited

U.S. PATENT DOCUMENTS

| | | | |
|---|---|---|---|
| 8,832,615 B2* | 9/2014 | Hsieh | G06F 17/5009 |
| | | | 716/106 |
| 8,869,093 B2* | 10/2014 | Elliott | G06F 17/5009 |
| | | | 710/100 |
| 9,081,924 B2* | 7/2015 | Chen | G06F 17/5022 |
| 2003/0154063 A1* | 8/2003 | Lu | G06F 17/5022 |
| | | | 703/14 |
| 2006/1019087 | 8/2006 | Likovich, Jr. et al. | |
| 2007/0033552 A1 | 2/2007 | Li | |
| 2008/0147372 A1* | 6/2008 | Paulsen | G06F 17/5022 |
| | | | 703/14 |
| 2008/0183457 A1* | 7/2008 | Klein | G06F 11/3664 |
| | | | 703/14 |
| 2008/0184150 A1* | 7/2008 | Minato | G06F 17/5022 |
| | | | 715/771 |
| 2010/0095255 A1 | 4/2010 | Thompson et al. | |
| 2011/0238397 A1* | 9/2011 | Chen | G06F 11/3672 |
| | | | 703/13 |
| 2011/0289373 A1* | 11/2011 | Klein | G06F 17/5022 |
| | | | 714/741 |

* cited by examiner

IDA -- Incisive Debug Analyzer

| Solutions | Graphs | modem_c::transmit [467] | Files... | svr_debug_util.sln | svr_soc_test.c |

402
- ▲all_of_f_1
  - ▲a1:all_of_f[36]
    - ▶ usb_c::read [61]
    - ▶ modem_transmit [83]
    - ▶ display_c::show [111]
    - ▲i2: capture [101]
      - ▲i3: decode_to_display [105]
        - ▶ a0: show [108]
    - ▶ usb_c::write [143]   406
    - ▶ audio_c::play [165]
    - ▶ usb_c::read [189]
- ▲ modem_c::transmit [211]
  - ▶ i8: capture [204]
  - ▶ a0: transmit [208]
  - ▶ display_c::show [239]
  - ▶ usb_c::write [271]
  - ▶ audio_c::play [293]
  - ▲i18: receive [286]
    - ▶ a0: play [290]
  - ▶ usb_c::read [317]
  - ▶ modem_c::transmit [339]
  - ▶ display_c::show [367]
  - ▶ usb_::write [399]
  - ▲i19: read [396]  404
    - ▶ audio_c::play [421]
    - ▶ usb_c::read [445]
  - ▶ modem_c::transmit [467]
  - ▶ display_c::show [495]
  - ▶ usb_c::write [527]
  - ▶ audio_c::play [549]

102

◯ ---▶ [ i22: capture [460]  camera_c  DVE.camera ]  109
              proc_tag       proc3

---▶ [ a0: transmit [464]  modem_c  DVE.modem ]  ---▶ ◯
              proc_tag       proc.

104

```
return SLN_TRUE;
}
if (scenario id == 83) {
/* check if this scenario can run */
int i;
unsigned int scenario_resources[2] = SVR_SCENARIO_83_RESOURCES;
svr_fast_message0_7(272);  /* check if scenario can run */
svr_fast_message0_7(273);  /* svr_resources_status_vector  my resources */
svr_fast_message2_7(274, svr_batch.svr_resources_status_vector[0],scenario_resources[     207
svr_fast_message2_7(275, svr_batch.svr_resources_status_vector[1],scenario_resources[
for (i = 0; i <= 1; ++i) {
    if (((scenario_resources[i]) & (~(svr_batch.svr_resources_status_vector[i]))) != (scenar
        return SLN_FALSE;
}
return SLN_TRUE;
}
if (scenario id == 61) {
/* check if this scenario can run */
int i;
unsigned int scenario_resources[2] = SVR_SCENARIO_61_RESOURCES;
svr_fast_message0_7(276);  /* check if scenario can run */
svr_fast_message0_7(277);  /* svr_resources_status_vector  my resources */
svr_fast_message2_7(278 , svr_batch.svr_resources_status_vector[0],scenario_resources[
svr_fast_message2_7(279 , svr_batch.svr_resources_status_vector[1],scenario_resources[
for (i = 0; i <= 1; ++i) {
    if (((scenario_resources[i]) & (~(svr_batch.svr_resources_status_vector[i]))) != (scenar     204
        return SLN_FALSE;
}
return SLN_TRUE;
return SLN_FALSE;}
```

METHOD AND SYSTEM FOR DEBUGGING A SYSTEM ON CHIP UNDER TEST

FIELD OF THE INVENTION

The present disclosure relates to design verification. More specifically, the present invention relates to method and system for debugging a system on chip under test.

BACKGROUND OF THE INVENTION

Given the design complexity of today's advanced systems on chip (SoCs), many engineers validate their SoCs using production software stacks and employing basic directed bare-metal software tests. Such efforts, which are both time consuming and labor-intensive, and often come up short in coverage of use cases.

SUMMARY OF THE INVENTION

There is thus provided, according to some embodiments of the present invention, a method for debugging a SoC under test. The method may include executing a test on the SoC, the test comprising a plurality of actions. The method may also include recording output data from the SoC resulting from the executed test. The method may further include linking between actions detected in the recorded output data and actions of the plurality of actions of the test by identifying a start and an end times of each of the detected actions in the recorded output data, and associating the identified start and end times with a start and an end times of actions of the plurality of actions of the test; and causing display, via a graphical user interface, of a waveform representation of the detected actions over time, a representation of the test and a representation of the output log.

In some embodiments, the method further includes receiving a selection by the user of an action in one of said representations; and indicating on at least one of the other representations a corresponding representation of the selected action.

In some embodiments, linking between the detected actions and the actions of the plurality of actions of the test may include assigning each of the start and the end of each of the detected actions a distinctly unique identification, and saving the assigned identification; and causing the assigned identification of each of the start and the end of each of the detected actions to appear in the recorded output data.

According to some embodiments, causing the assigned identification of each of the start and the end of each of the detected actions to appear in the recorded output data may include including messages in the test code.

In some embodiments, the recorded output is saved in a form a database or a text list.

In some embodiments the representations are caused to be displayed in separate frames on a screen.

BRIEF DESCRIPTION OF THE DRAWINGS

In order to better understand the present invention and appreciate its practical applications, the following figures are provided and referenced hereafter. It should be noted that the figures are given as examples only and in no way limit the scope of the invention. Like components are denoted by like reference numerals.

FIG. 3 illustrates still another screen of a graphical user interface (GUI) of a SoC debugger, in accordance with some embodiments of the present invention.

DETAILED DESCRIPTION OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Typically, the mainstream approach to testing of a system on a chip (SoC) is to exercise the system-level use-cases via the programmer-view using software (SW) driven tests (sometimes referred to as "scenarios"). These tests are typically manually written (e.g., in C), either targeting bare-metal hardware without an operating system (OS) or on top of some form of production software stack (SS), and require fast platforms such as Field Programmable Gate Array (FPGA) prototyping, emulation, or an actual silicon device for the testing.

Tests are designed to exercise a SoC by causing the SoC to perform various actions it is designed to perform. Typically, an SoC may perform a large number of actions, which may only be performed in a permissible order (or "flow"). Some of these actions may be performed separately (e.g., turning the power on), some may be performed concurrently with other actions (e.g., displaying video on a screen and playing audio on a loudspeaker). Some actions may only be performed after one or a plurality of other (or same) actions were previously performed and completed (e.g., microphone is turned on only after "record" is pressed). Some actions cannot be performed after one or a plurality of other (or same) actions were previously performed and completed (e.g., the power of the SoC was turned off). The testing expert writes a series of scenarios that include, each including a combination of actions that the SoC is capable of performing, in a permissible order. "Permissible order" is meant to refer to all possible orders of actions that may be performed by the SoC, and that comply with the constraints governing the operation of the SoC and in particular the performance of actions by the SoC (order of actions, data-flow, etc.).

The tedious manual approach, the quest for quality test content, and the lack of a coverage driven flow are the biggest concerns for advanced multi-core SoC providers.

At the sub-system and system integration levels, hardware (HW) verification engineers deal with more hardware and software interdependencies and need to adjust as well. In many instances, they desire to explore a subset of SoC use-cases that can be executed on register transfer level (RTL) simulation and acceleration platforms. A coverage driven random approach that is useful for IP level may not serve the system-level use-cases well because it focuses on verifying all possible combinations, and makes the high-level directed test logic coding error prone.

Furthermore, the cost of transferring use-cases across teams and platforms (from virtual to RTL simulation to acceleration/emulation to FPGA prototype to post-silicon, etc.) is becoming untenable for chip-makers, thereby creating a commercial demand for a solution that allows complex use-case creation and reuse across teams, and that allows for the tests to be executed on all platforms. Portability across platforms not only improves quality and saves development time, but it also allows more efficient debugging by offering the flexibility to move a failing test found running on a fast platform with limited visibility to a different platform with more visibility.

The term 'system-level use-cases' is taken, in the context of the present specification, in a broad sense to include application-like flows and datapaths, stress tests of interconnect fabrics and memories, and exercising system-level protocols such as cache and input-output (TO) coherency, security, memory virtualization and low-power management. Although very different in nature, there is in fact commonality in the implementation of these.

Consider the following test implementation challenges:

A) Coming up with consistent configuration of multiple IPs and resource allocation: legal pad settings, DMA channel allocations, interrupt lines, video pipes, etc.

B) Scheduling and synchronizing concurrent activity: (a) on multiple HW devices using a single embedded core; (b) across multiple embedded cores; (c) between embedded cores, testbench transactors, and host executed logic.

C) Handling crosscutting activity on the very same cores, such as power-down or reset events during memory or cache data flow operations.

D) Covering complex state-spaces like coherency protocol state-machine or multi-domain low-power specifications.

E) Creating and coordinating multiple test artifacts (other than the embedded code) such as bus functional model (BFM) commands, expected data files, and compilation/run script.

Most if not all of the abovementioned challenges come into play in the implementation of different kinds of system use-cases. On top of these, test implementation is aimed at addressing other concerns, such as multiple platforms, adequate checking strategy, debug, maintenance, and functional coverage for completion measurement.

In terms of test creation, users may write a single-thread program, and even come-up with a Perl-like automation around it. Talented programmers may even write use-cases involving two or more cores, while carefully orchestrating system states, synchronization points, and latencies throughout the execution. But this is not scalable. It does not scale with complexity of the required scenarios, being longer, and involving more cores, more sophisticated IPs, more power domains. It does not scale to the amount of different parameter variations that need to be tested for each use-case. And, it cannot be maintained and adapted through the changes of underlying designs and SW APIs, as well as the differences in execution platforms.

To fully address SoC-level verification, a solution may be characterized as allowing not only for vertical (IP to SoC) reuse and horizontal (cross-platform) reuse, but also for providing a way to capture and share use-cases. Reuse should preferably work both ways, as sub-system teams wish to leverage the full system context and use-cases and wish become more productive in their testing.

A system and method for system verification (hereinafter also referred to as "system verifier") was introduced that is a use-case based verification tool tailored for software driven verification automation. The system verifier offers a model-based approach to describe system level actions and resources that can be composed into subsystem and system level abstract use-cases. The system verifier can automatically generate SoC verification tests, rather than depend on a human testing expert to write up these tests.

The automatic generation of SoC verification tests may include receiving from a user (e.g., a testing expert) a list of all actions the SoC to be tested may perform and constraints relating to the permissible order of these actions.

The system verifier employs a constraint solver that analyzes abstract use-cases, finds permissible solutions or concrete use-cases that fulfil the goals represented in the abstract use case, and ultimately generates concrete permissible (also referred to as "legal") tests.

Thus, the SoC may now be tested using the generated permissible tests.

In some embodiments of the present invention, the permissible tests are generated in the form of graphs (and consequently in the form of executable files that may run to operate the SoC in accordance with the test scenario). A testing expert may take graphs representing the automatically generated tests and amend them. For example, the testing expert may amend the tests by adding or removing actions or changing the order of the actions (provided the new order is permissible too).

Thus, generating SoC tests became more efficient and less time-consuming.

However, the testing expert is still left with a tedious task of debugging. Since the verification tests are carried out on an SoC, conventional debuggers are not suited for the job, as actions on the SoC are carried out at a run-time speed, unlike device-under-test (DUT) code simulations. In these circumstances, it is not possible to use conventional debugging tool.

According to some embodiments of the present invention, a new method for debugging a SoC and a debugging system are introduced.

According to some embodiments, the output of the SoC that resulted from the execution of the verification tests (which may be manually or automatically generated) is recorded and saved. The recorded output may include the actions that were actually performed by the SoC when the test was executed, timing of these actions (e.g., start time, end time), data that was output, and any other output event. "Start time' and "end time" may also refer to "resume time" and "pause time", respectively, in the sense that the start time of the action may relate to the time when a paused action was resumed, and the end time of the action may relate to the time that action was paused. Typically, in order to send a data packet and comply with an internal-protocol, the action manager notifies the internet action controller of a packet ready to be sent and also notifies when the action has been completed, thereby the action manager initiates start-run and then waits until a notification is received that confirms that the sub-actions are completed and then resumes execution until reaching end-run. The recorded output may be saved in a log file or log files. The log file may be saved in any of a variety of forms (e.g., a text list, database, etc.). In some embodiments, the output of the SoC for each test is recorded and saved separately (e.g., in a separate log file). Each action is uniquely assigned (e.g., in the log) identification (ID), e.g., ID number or tag, to distinctly identify it and distinguish it from other actions (including from other occurrences of the same action).

A debugger, according to some embodiments of the present invention, may include a graphical interface which may be displayed on a display device to the testing expert.

Figure 1:
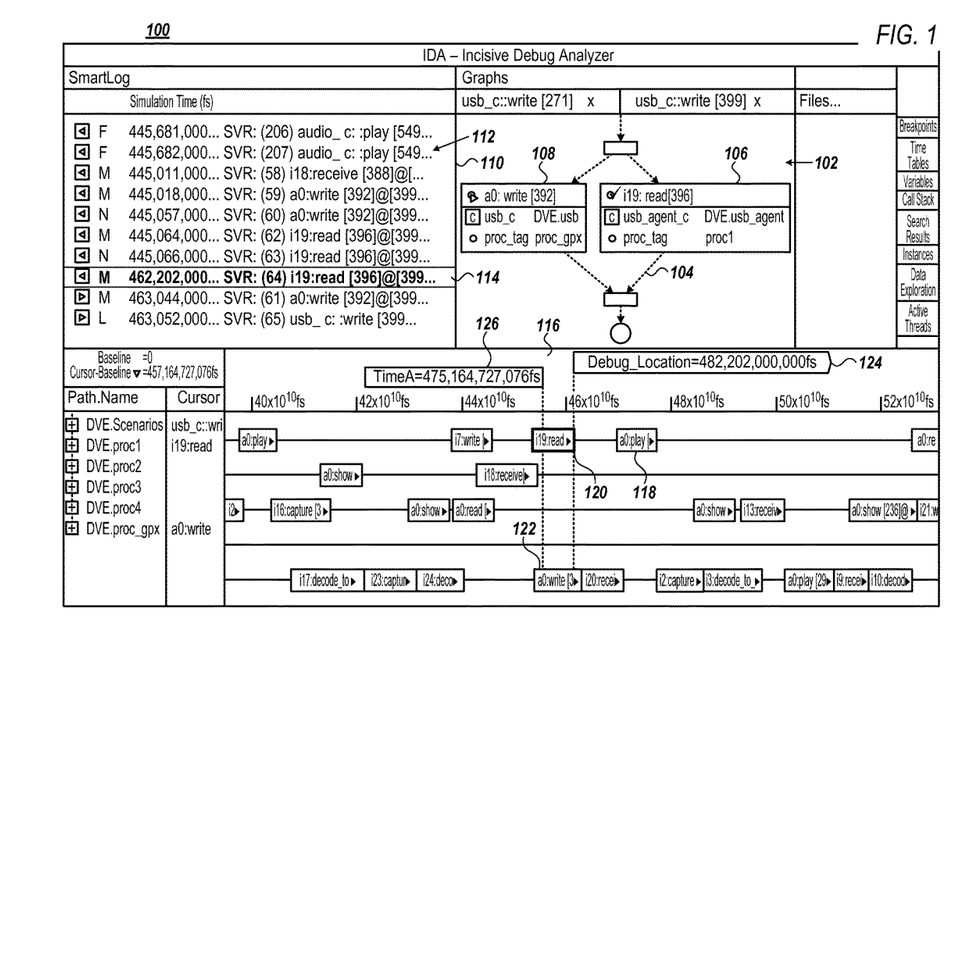
FIG. 1 illustrates a screen depicting a graphical user interface (GUI) of a SoC debugger, in accordance with some embodiments of the present invention.

FIG. 1 illustrates a screen 100 of a graphical user interface (GUI) of an SoC debugger, in accordance with some embodiments of the present invention.

GUI screen 100 may include one or a plurality of frames in which data is displayed to the testing user. In some embodiments, GUI screen 100 includes frame 102 in which a graph 104, which is an abstract representation of a verification test that was run on the SoC, is presented. Graph 104 may include the various actions that formed that particular test, such as, for example "read" 106 and "write" 108. These actions appear to be actions that may be performed simultaneously, for they are located at parallel nodes of graph 104. In the present example of FIG. 1, action "read" 106 is assigned ID number 396, while action "write" 108 is assigned ID number 392 (these numbers appear on the blocks representing these actions in graph 104. The abstract representation of the test, namely graph 104, may also include status data on each action (e.g., not-started, running, blocking, ended, etc.).

GUI screen 100 further includes frame 110, in which the output log 112 (the recorded output of the executed test—the same test whose abstract graph representation 104 appears in frame 102 on SoC) is presented. In the present example, the output log 112 is in the form of a list of lines of messages corresponding to the recorded actions, each message corresponding to a single action, priority status of the message (e.g., F for "full", H for "high", M for "Medium" and L for "Low"), the timing of that action, and the message itself. Output log 112 may include implicit output information resulting from the execution of the code of the test, and explicit output information that was added by the user.

GUI screen 100 also includes frame 116, in which a graphical representation of the occurrence of each action versus time, in a waveform, is presented. The actions 118 appearing in this waveform are shown in the form of blocks whose length is determined by their performance duration, and their position on the waveform is determined by their timing. Thus, for example it is evident that action "read" 106 of graph 104 (in frame 102) is represented by block 120 in frame 116, while action "write" 108 of graph 104 is presented by block 122 in that frame. It is also evident from this GUI that actions 106 and 108 were executed substantially concurrently, as their block representations (120 and 122 respectively) appear to commence at the same time, as suggested by their aligned (one on top of the other) start positions in the waveform, whereas the "read" action ends slightly before the "write" action.

GUI screen 100 may further include additional information (e.g., memory image, relating to the memory of the SoC, and other data), that is presentable to the testing expert on a display device.

The user may select a position on the waveform (e.g., by clicking a pointing device over that location), and a corresponding location indicator 124 may be presented with information on the selected location (e.g., the timing corresponding to that location within the test execution, or other location data).

In some embodiments of the present invention, the user may select a line of the output log 112, for example by clicking on that line 114, thereby causing that line to appear highlighted. The debugger may be designed to react to such selection of the line of the output log, by highlighting (or otherwise indicating) the selected action in the abstract graph 104, and/or by highlighting the block on the waveform presented in frame 116 that corresponds to the selected action. This allows a testing expert to quickly and easily track and trace actions and their resulting output as appearing on the GUI screen 100.

The waveform feature of the SoC debugger, according to some embodiments of the present invention, allows the testing expert to immediately spot irregularities or abnormalities in the execution of the SoC test. For example, the testing expert may spot on the waveform a certain action that was supposed to be performed over a short period of time but lasted longer (or too much linger). The testing expert may identify actions that where not supposed to be performed at the timing of their actual performance, or were not supposed to be performed at all. Thus, the testing expert is provided with a graphical visualization of the executed test and its results, presenting go-to-cause debug information, making it simpler for the testing expert to find bugs and identify their causes.

Figure 2:
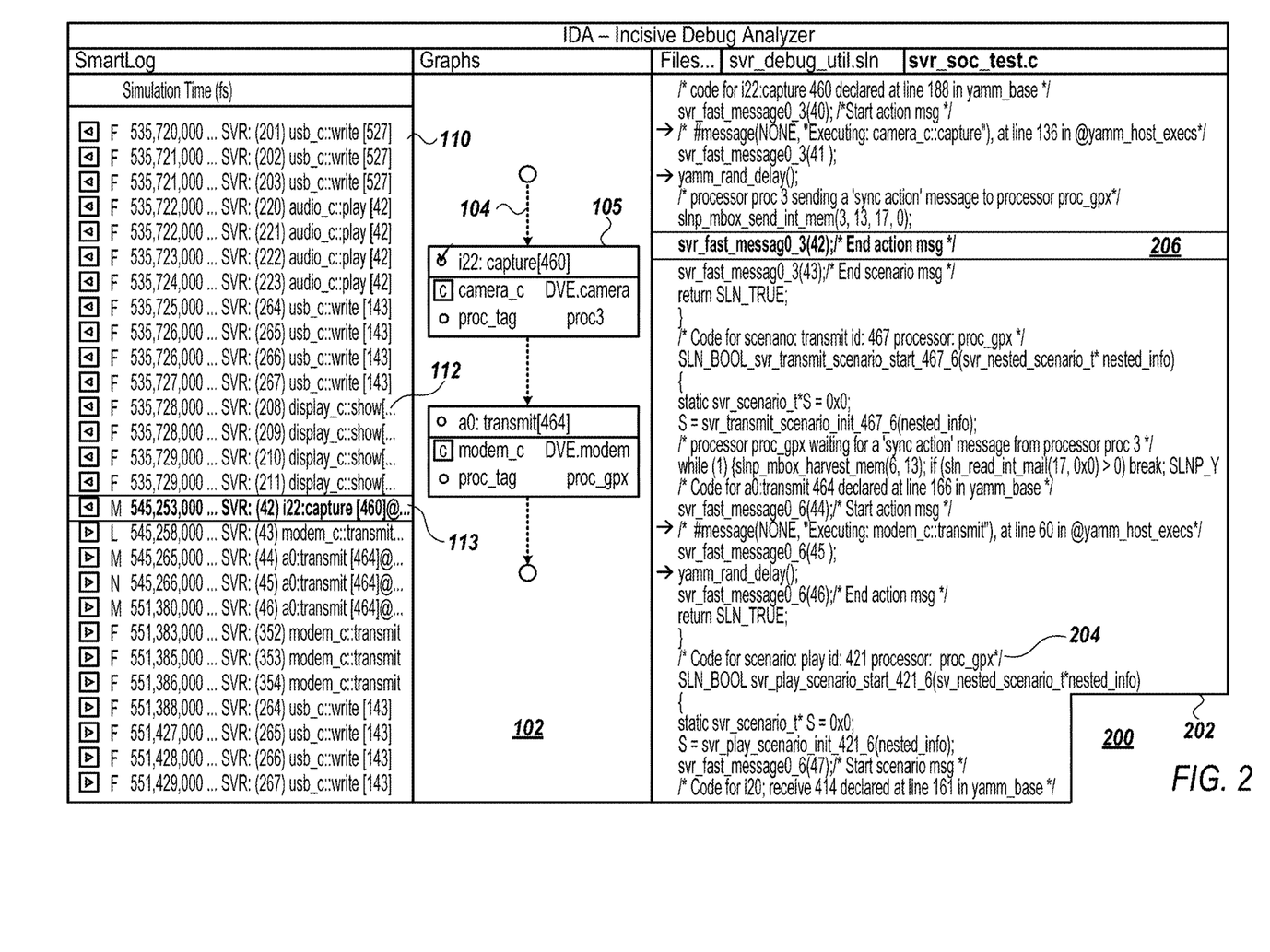
FIG. 2 illustrates another screen of a graphical user interface (GUI) of a SoC debugger, in accordance with some embodiments of the present invention.

FIG. 2 illustrates another screen 200 of a graphical user interface (GUI) of an SoC debugger, in accordance with some embodiments of the present invention. In screen 200, frame 202 may present the script code of the verification test, whose abstract graph representation 104 is also presented in that screen.

According to some embodiments of the present invention, the testing expert may select a line 113 in the output log 112 presented in frame 110, highlighting that line. Consequently, action 105 in graph 104, which correlates to the selected line (the action in that line and the highlighted action in graph 104 correspond—it is the same action) is also highlighted, and so is the corresponding line 206 in the script code 204, presented in frame 202.

FIG. 3 illustrates another screen 300 of a graphical user interface (GUI) of an SoC debugger, in accordance with some embodiments of the present invention. Upon selection of action "receive [76]" 107, all messages 117 that relate to that action appear highlighted in frame 110 where the output log 112 is presented. The testing expert may wish to review the code line which invoked a particular message (and action), so by clicking on one of the small triangles 119 a view of some or all of the test code 204 is presented in frame 202, with the code line that invoked the message and corresponding action highlighted 205.

Figure 4:
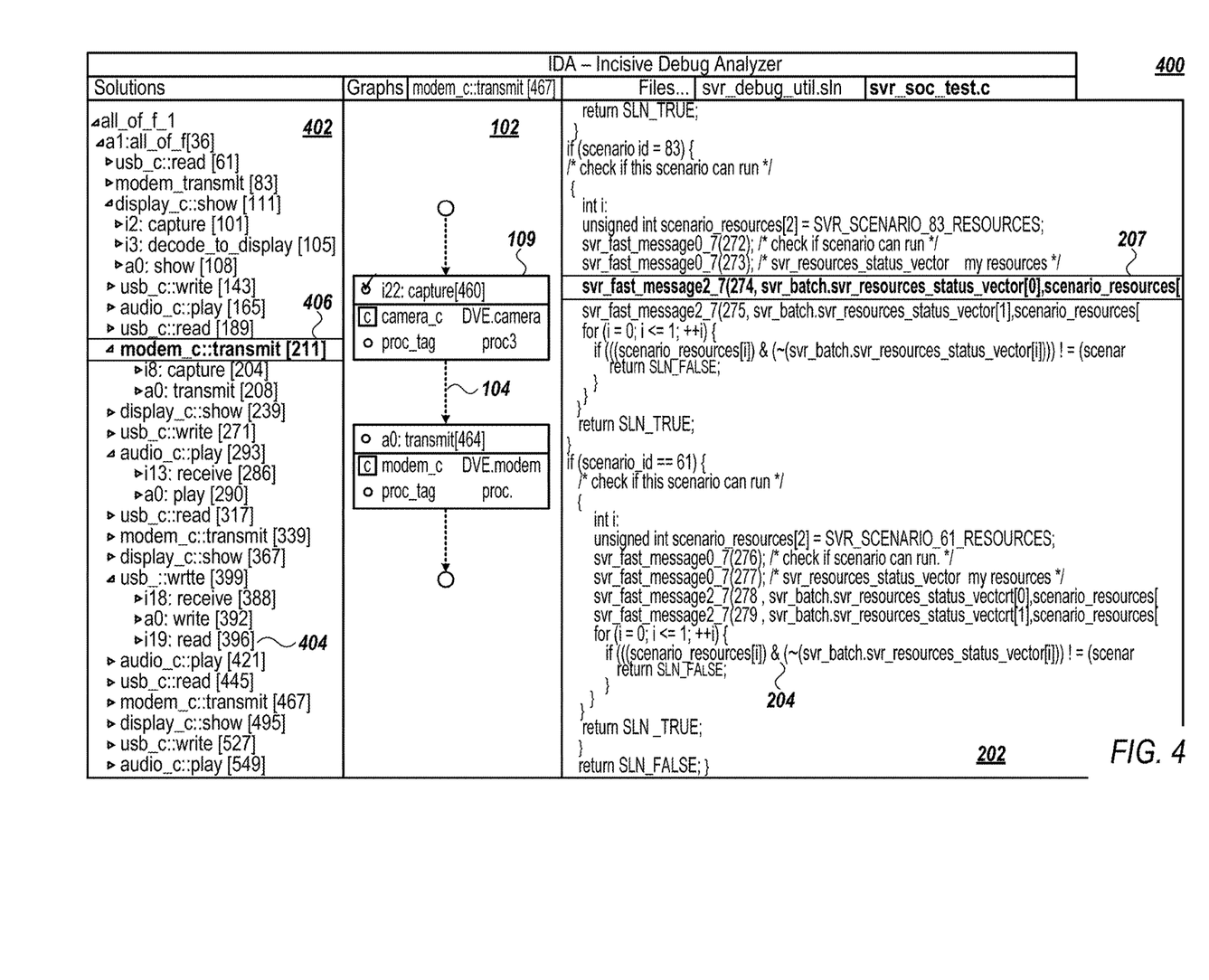
FIG. 4 illustrates yet another screen of a graphical user interface (GUI) of a SoC debugger, in accordance with some embodiments of the present invention.

FIG. 4 illustrates yet another screen of a graphical user interface (GUI) of an SoC debugger, in accordance with some embodiments of the present invention. Often the sheer size of the abstract graph makes it practically impossible to be presented in a graphical form. Thus, the abstract graph may be presented in a text form. In screen 400, a new frame 402 is presented which includes a text form 404 of the abstract graph. When a certain line 406 that includes an action in the text form 404 of the abstract graph is selected, a portion 109 of the graphical representation of that graph 104 that includes the selected action is highlighted. As the debugger can link between specific actions in the test code and in the output log (one method to obtain this linkage is detailed below) the corresponding line 207 in the test code 204 is highlighted.

The linking of the various representations on the same action in the code script, in the output log and on the waveform may easily be performed. One simple way of doing that is described hereinafter:

In the generation of the test code, the generator of the code plants messages (e.g., remarks) in the generated test code, assigning the start and end of each action with a unique ID (e.g., number). All starts and ends of actions are identified by a distinctly unique ID (e.g., the start of action a1 is assigned ID number 1, the end of action a1 is assigned ID number 2, the start of action a2 is assigned ID number 3, the end of action a2 is assigned ID number 4, and so on).

A reference file, in which all starts and ends of all actions in the test are saved with their corresponding IDs, is provided.

When the test is executed, the messages appear in the output log, allowing identification of the start and end of each action performed during the test, and association of these start and end of each action with the start and end of actions in the output log. The graphical waveform representation may be generated based on this identification and association, and the links between the various representations of each action may be established.

Figure 5:
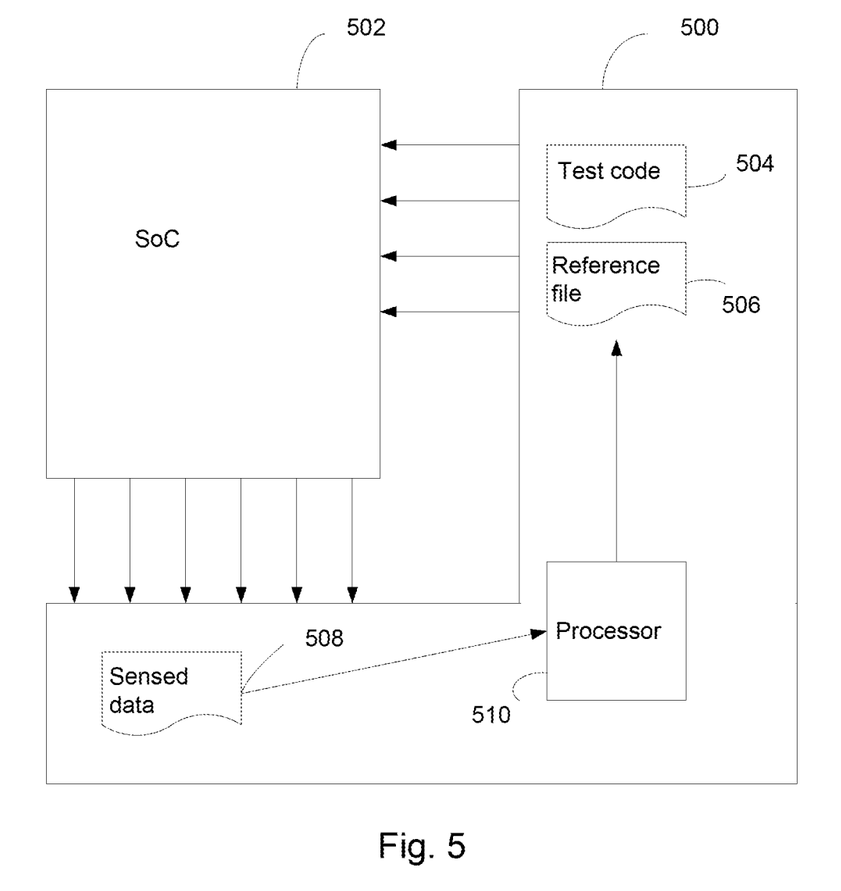
FIG. 5 illustrates a system for verification testing of a SoC, according to some embodiments of the present invention.

FIG. 5 illustrates a system 500 for verification testing of a SoC 502, according to some embodiments of the present invention. System 500 includes a processor 510 that is configured to execute a test code 504 by injecting data (which may include commands and information) into SoC 502. A reference file 506 is saved for accessing by processor 510 in order to link between the actions of SoC 502 invoked by test code 504 and the output data relating to the performed actions.

The operation of SoC generates during the test is sensed, and the sensed data 508 recorded and provided to processor 510, where the received data is processed and links between the invoked actions by the test code and the actual actions performed during the test are established.

Figure 6:
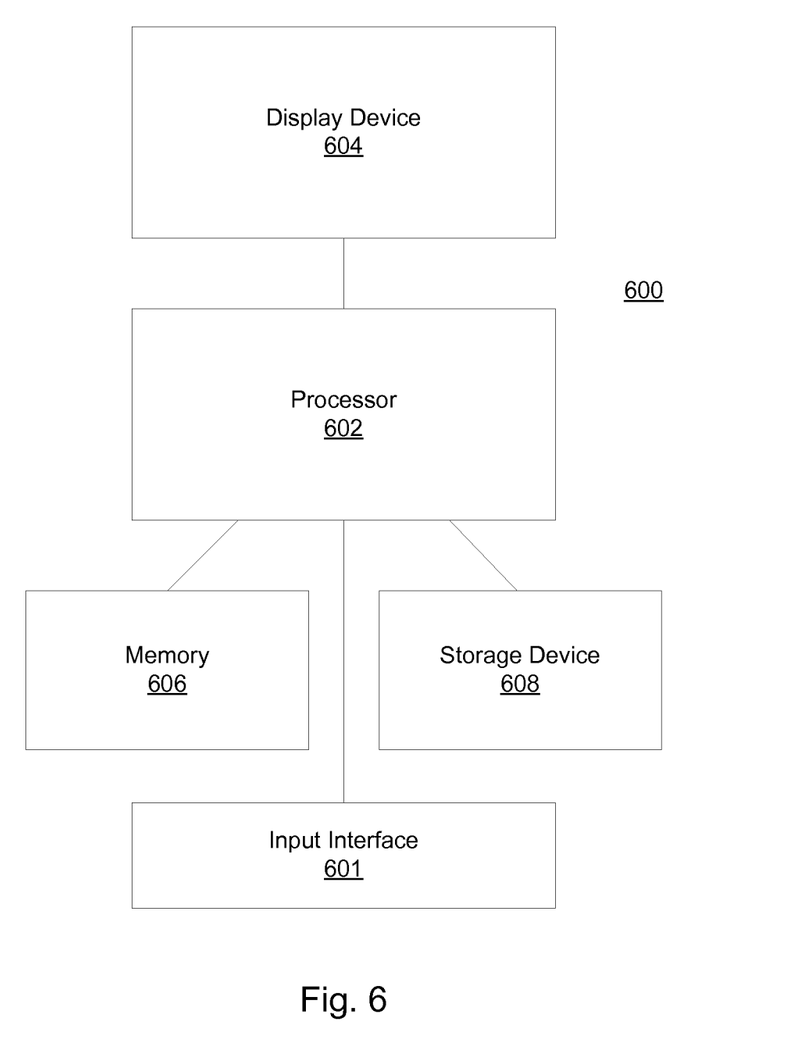
FIG. 6 illustrates a debugger system for debugging a SoC under test, according to some embodiments of the present invention.

FIG. 6 illustrates a debugger system 600 for debugging a SoC under test, according to some embodiments of the present invention.

System 600 may include a processing unit 602 (e.g., one or a plurality of processors, on a single machine or distributed on a plurality of machines) for executing a method according to some embodiments of the present invention.

System 600 may include an input interface 601 for receiving data and instructions from a user, such as, for example, one or a plurality of keyboards, pointing devices, touch sensitive surfaces (e.g. touch sensitive screens), etc. for allowing a user to input commands and data. Processing unit 602 may be linked with memory 606 on which a program implementing a method according to some embodiments of the present invention and corresponding data may be loaded and run from and data may be saved, and storage device 608, which includes a non-transitory computer readable medium (or mediums) such as, for example, one or a plurality of hard disks, flash memory devices, etc. on which a program implementing a method according to some embodiments of the present invention and corresponding data may be stored. System 600 may further include an output device 604 (e.g., display device such as CRT, LCD, LED, etc.) on which one or a plurality user interfaces associated with a program implementing a method according to some embodiments and corresponding data may be presented.

In some embodiments of the present invention, system 500 and system 600 may be unified. In some other embodiments, these systems may be separate.

Figure 7:
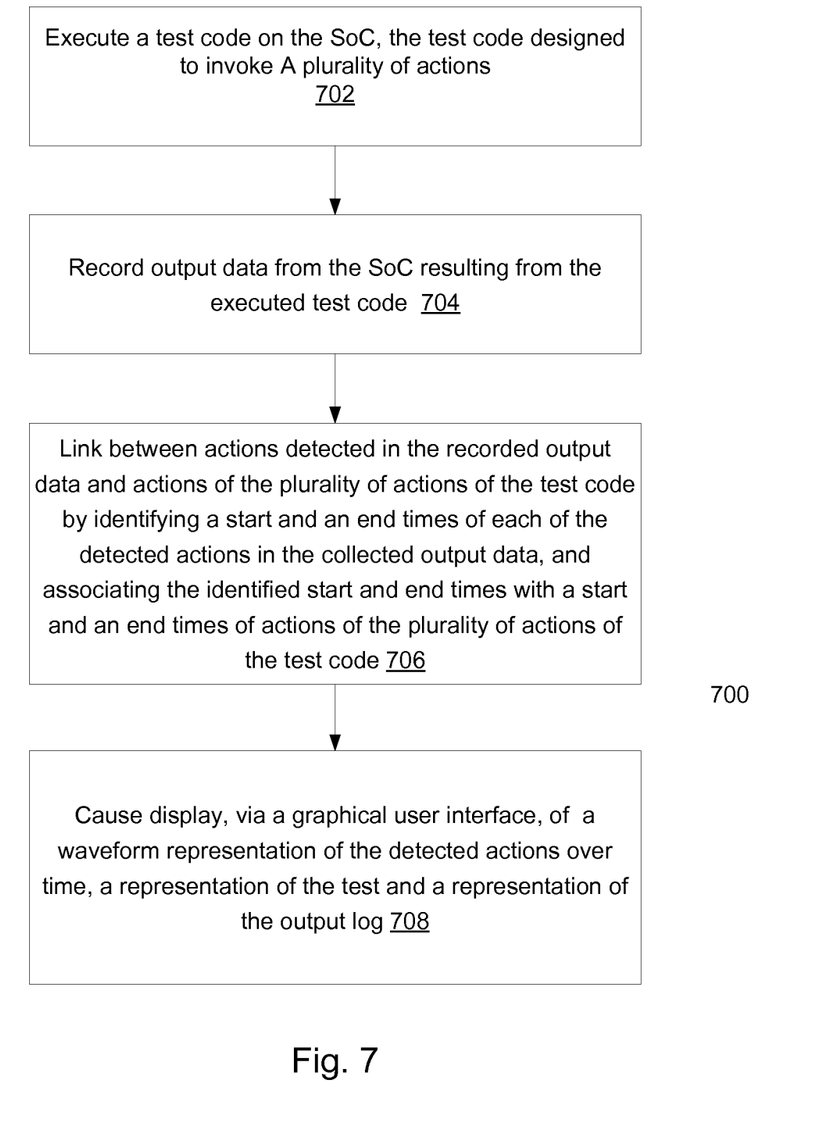
FIG. 7 illustrates a method for debugging a SoC under test, according to some embodiments of the present invention.

FIG. 7 illustrates a method for debugging a SoC under test, according to some embodiments of the present invention. Method 700 may include executing 702 a test on the SoC, the test comprising a plurality of actions. Method 700 may also include recording 704 output data from the SoC resulting from the executed test. Method 700 may further include linking 706 between actions detected in the recorded output data and actions of the plurality of actions of the test by identifying a start and an end times of each of the detected actions in the recorded output data, and associating the identified start and end times with a start and an end times of actions of the plurality of actions of the test; and causing 708 display, via a graphical user interface, of a waveform representation of the detected actions over time, a representation of the test and a representation of the output log.

In some embodiments, the method further includes receiving a selection by the user of an action in one of said representations; and indicating on at least one of the other representations a corresponding representation of the selected action.

In some embodiments, linking between the detected actions and the actions of the plurality of actions of the test may include assigning each of the start and the end of each of the detected actions a distinctly unique identification, and saving the assigned identification; and causing the assigned identification of each of the start and the end of each of the detected actions to appear in the recorded output data.

According to some embodiments, causing the assigned identification of each of the start and the end of each of the detected actions to appear in the recorded output data may include including messages in the test code.

In some embodiments, the recorded output is saved in a form a database or a text list.

In some embodiments, the representations are caused to be displayed in separate frames on a screen.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples, the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for debugging a system on chip (SoC) under test, the method comprising:
   executing a test code on the SoC, the test code designed to invoke a plurality of actions, each of a start and an end of each action of the plurality of actions being assigned a distinctly unique identification;
   recording output data from the SoC resulting from the executed test code, the recorded output data including actions that were performed by the SoC, the assigned identification of the start and the end of each action of the plurality of actions of the test code appearing in the recorded output data;
   using the assigned identification to link between the performed actions in the recorded output data and actions of the plurality of actions of the test code; and
   causing display, via a graphical user interface, of a waveform representation of the performed actions over tune, a representation of the test code and a representation of an output log of the performed actions.

2. The method of claim 1, further comprising
   receiving a selection by a user of a performed action of the performed actions that are represented in one of said representations; and
   indicating on at least one of the other representations a corresponding representation of the selected action.

3. The method of claim 1, wherein the assigned identification of each of the start and the end of each action of the plurality of actions is included in a message in the test code.

4. The method of claim 1, wherein the recorded output data is saved in a form a database or a text list.

5. The method of claim 1, wherein the representations are caused to be displayed in separate frames on a screen.

6. A system for debugging a system on chip (SoC) under test, the system comprising:
   a memory; and
   a processor configured to:
      execute a test code on the SoC, the test code designed to invoke a plurality of actions, each of a start and an end of each action of the plurality of actions being assigned a distinctly unique identification;
      record output data from the SoC resulting from the executed test code, the recorded output data including actions that were performed by the SoC, the assigned identification of the start and the end of each action of the plurality of actions of the test code appearing in the recorded output data;
      use the assigned identification to link between the performed actions in the recorded output data and actions of the plurality of actions of the test code; and
      cause display, via a graphical user interface, of a waveform representation of the performed actions over time, a representation of the test code and a representation of an output log of the performed actions.

7. The system of claim 6, wherein the processor is further configured to receive a selection by a user of a performed action of the performed actions that are represented in one of said representations; and indicate on at least one of the other representations a corresponding representation of the selected action.

8. The system of claim 6, wherein the processor is configured to cause the recorded output data to be saved in a form of a database or a text list in the memory.

9. The system of claim 6, wherein the processor is configured to cause the representations to be displayed in separate frames on a screen.

10. A non-transitory computer readable storage medium for debugging a system on chip (SoC) under test, having stored thereon instructions that, when executed by a processor, will cause the processor to:
    execute a test code on the SoC, the test code designed to invoke a plurality of actions, each of a start and an end of each action of the plurality of actions being assigned a distinctly unique identification;
    record output data from the SoC resulting from the executed test code, the recorded output data including actions that were performed by the SoC, the assigned identification of the start and the end of each action of the plurality of actions of the test code appearing in the recorded output data;
    use the assigned identification to link between the performed actions in the recorded output data and actions of the plurality of actions of the test code; and
    cause display, via a graphical user interface, of a waveform representation of the performed actions over time, a representation of the test code and a representation of an output log of the performed actions.

11. The non-transitory computer readable storage medium of claim 10, wherein the instructions further include
    receiving a selection by a user of a performed action of the performed actions that are represented in one of said representations; and
    indicating on at least one of the other representations a corresponding representation of the selected action.

12. The non-transitory computer readable storage medium of claim 10, wherein the instructions include saving the recorded output data in a form a database or a text list in the memory.

13. The non-transitory computer readable storage medium of claim 10, wherein the instructions include causing the representations to be displayed in separate frames on a screen.

* * * * *